Oct. 19, 1965   R. J. OLANDER   3,212,805
DOOR LOCKING AND STABILIZING MECHANISM
Filed June 20, 1962   2 Sheets-Sheet 2
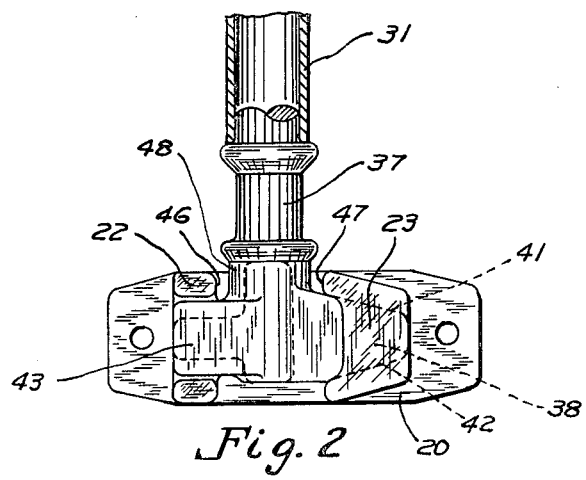
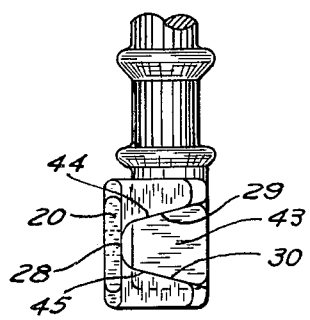
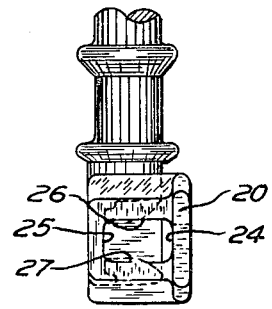
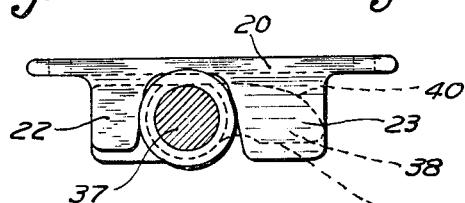
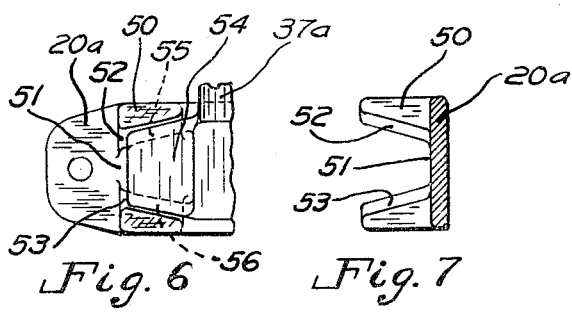
INVENTOR.
Roland J. Olander
BY
Atty.

United States Patent Office 3,212,805
Patented Oct. 19, 1965

3,212,805
DOOR LOCKING AND STABILIZING MECHANISM
Roland J. Olander, La Grange, Ill., assignor to W. H.
Miner, Inc., Chicago, Ill., a corporation of Delaware
Filed June 20, 1962, Ser. No. 203,798
12 Claims. (Cl. 292—218)

My present invention relates generally to door locks and more particularly to door locking and stabilizing mechanism for the doors of transport vehicles.

Transport vehicles or highway trailers having enclosed trailer bodies are usually provided at the rear end thereof either with a single door which has a vertical edge hinged to the one side of the rear frame of the trailer body or a pair of doors each of which has a vertical edge hinged to the opposite sides of the rear frame of the trailer body. These doors are adapted to be swung within the plane of the rear frame of the trailer body for closing the rear end thereof. Because the trailer body door frame is normally unbraced and the door or doors are only relatively loosely fastened in closed position, deformation and structural failure of the door frame tends to occur as a result of shifting loads within the trailer body, thereafter rendering it difficult to properly dispose the door or doors within the plane of the frame.

It is an object of my present invention to provide means for structurally locking the door or doors within the door frame so as to prevent deformation of the door frame, structural failure of the door frame, and wear between a pair of doors and between a door or doors and the frame.

It is another object of my present invention to provide locking means, as described, which is operative to force the door or doors within the plane of the frame as they approach the latter.

It is a further object of my present invention to provide locking means, as described, which is operative to force the frame and door relatively in a vertical direction to align the same as the door is swung within the plane of the frame.

In order to accomplish the aforementioned objects, I propose to mount keeper means on the upper and lower elements of the door frame with each of the keeper means having laterally spaced forwardly extending projections. One of the projections of each keeper means has a lateral opening therein with an inner forward surface and with upper and lower inner surfaces, and the other of the projections of each keeper means has a recess therein with an open forward end and with upper and lower rearwardly extending inner surfaces. Rotatably mounted on the outer face of the door is a vertically extending shaft with the ends thereof being provided with locking elements arranged for cooperation with the keeper means. More specifically, first radially extending fingers, one each on the upper and lower ends of the shaft, are adapted to be received in the lateral openings in the keeper means on rotation of the shaft, and second radially extending fingers, one each on the upper and lower ends of the shaft, are adapted to be received in the recesses in the keeper means on rotation of the shaft. The first fingers during engagement with the inner forward surfaces of the lateral openings in the keeper means serve to force the door within the plane of the frame. In addition, the first fingers upon engagement with the upper and lower inner surfaces of the lateral openings in the keeper means and the second fingers upon engagement with the upper and lower inner surfaces of the recesses in the keeper means serve to force the frame and door relatively in a vertical direction to align the same as the door is swung within the plane of the frame. Finally, the first fingers when in full engagement with the inner forward surfaces of the lateral openings in the keeper means serve to restrain the door from swinging outwardly of the plane of the frame. In sum, the door locking and stabilizing mechanism described above serves to structurally lock the door within the door frame to prevent deformation of the latter.

Now in order to acquaint those skilled in the art with the manner of constructing and utilizing devices in accordance with the principles of my present invention, I shall describe in connection with the accompanying drawings a preferred embodiment of my invention.

In the drawings:

FIGURE 2 is an enlarged front elevational view of the lower portion of the door locking and stabilizing mechanism of FIGURE 1;

FIGURE 3 is an elevational view of one side of the portion of the door locking and stabilizing mechanism shown in FIGURE 2;

FIGURE 4 is an elevational view of the other side of the portion of the door locking and stabilizing mechanism shown in FIGURE 2;

FIGURE 5 is a plan view of the portion of the door locking and stabilizing mechanism shown in FIGURE 2 with a part thereof appearing in horizontal section;

FIGURE 6 is a partial front elevational view corresponding generally to FIGURE 2 and showing the lower portion of a modified embodiment of door locking and stabilizing mechanism of my present invention; and FIGURE 7 is a median vertical sectional view of the keeper member of FIGURE 6.

Figure 1:
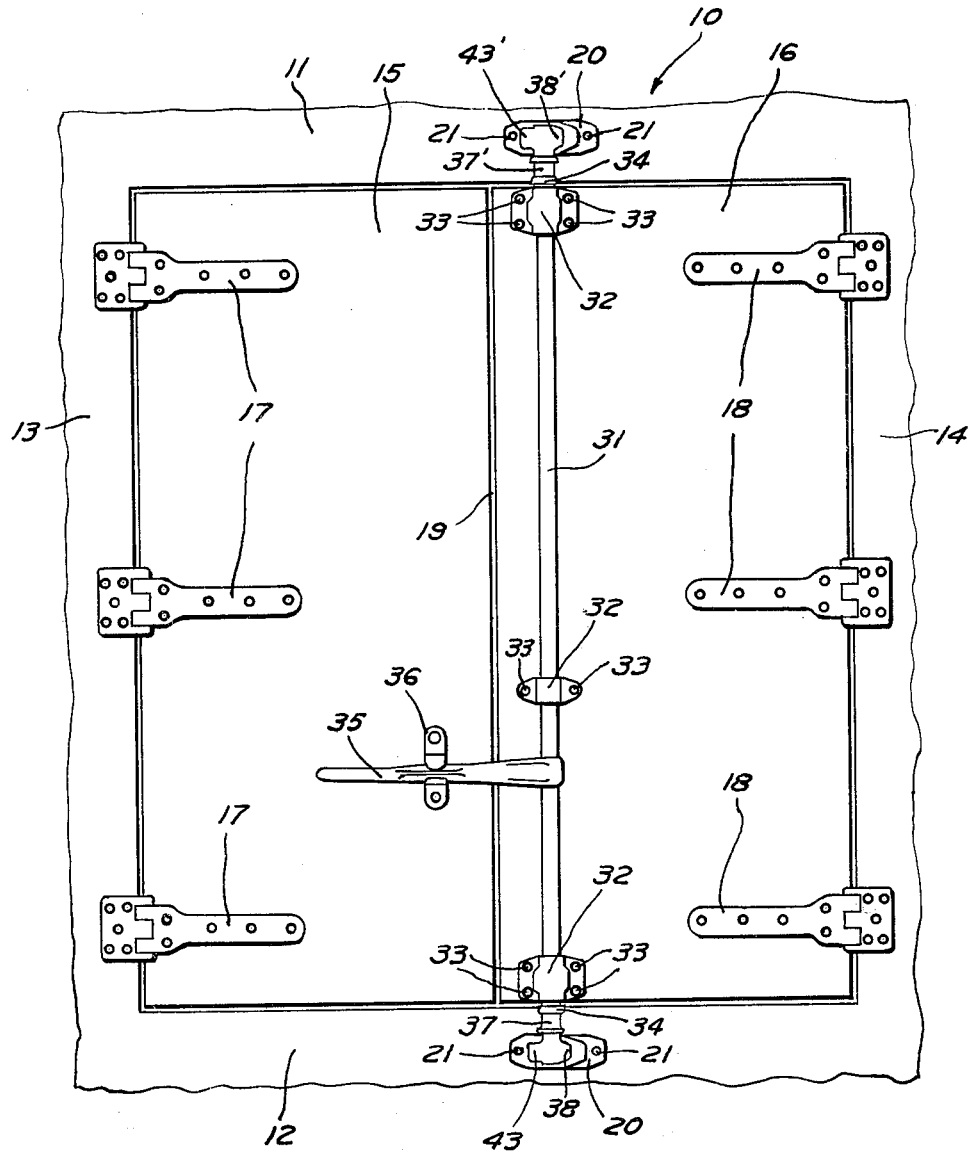
FIGURE 1 is an elevational view of a door frame and a pair of doors with which the door locking and stabilizing mechanism of my present invention has been incorporated.

Referring now to FIGURE 1, there is indicated generally by the reference numeral 10 a conventional door frame which may, for example, be located at the rear end of the body of an enclosed transport vehicle. The door frame 10 comprises horizontal upper and lower structural elements 11 and 12 and vertical side structural elements 13 and 14. Disposed within the door frame 10 for closing the same are a pair of doors 15 and 16 which are, respectively, pivotally mounted along their one vertical edges to the side door frame elements 13 and 14 by means of hinges 17 and 18. Secured to the rear face of the door 15 and projecting therefrom along the vertical free edge thereof is a stop or limit strip 19 which is engageable by the vertical free edge of the door 16 for preventing outward swinging movement of the door 15 when the doors 15 and 16 are within the plane of the door frame 10.

The door locking and stabilizing mechanism of my present invention, which is adapted to structurally lock the doors 15 and 16 within the door frame 10, comprises a pair of keeper members 20 mounted, as by bolts 21, to the upper and lower door frame elements 11 and 12. Each keeper member 20, as shown in FIGURES 2 through 5, has laterally spaced forwardly extending projections 22 and 23. The projection 23 has a lateral opening 24 therein with an inner forward surface 25 and with upper and lower inner surfaces 26 and 27 tapering toward each other in a lateral direction away from the center of the keeper member 20. The projection 22 has a recess 28 therein with an open forward end and with upper and lower inner surfaces 29 and 30 tapering toward each other in a rearward direction.

Arranged for operative association with the keeper members 20, as shown in FIGURE 1, is a vertically extending hollow shaft 31 rotatably journaled in bracket members 32 suitably secured, as by bolts 33, to the outer face of the door 16. The shaft 31 is provided with collar portions 34, one adjacent the upper end of the upper bracket 32 and the other adjacent the lower end of the lower bracket 32 for restricting axial vertical movement of the shaft 31. Means for rotating the shaft 31 is provided in the form of a horizontal hand lever 35 normally retained in the seal member 36 as shown in FIGURE 1.

Secured within the lower and upper ends, respectively, of the hollow shaft 31 are shaft extensions or carrier members 37 and 37'. As shown in FIGURES 2 through 5, the shaft extension 37 is formed with a radially extending finger 38 adapted to be received in the lateral opening 24 of the keeper member 20. The finger 38 has a planar forward surface 39, an arcuate rear surface 40, and upper and lower surfaces 41 and 42 tapered for interengagement with slight clearance with the upper and lower inner surfaces 26 and 27 of the lateral opening 24 in the keeper member 20. The shaft extension 37 is further formed with an opposite radially extending finger 43 having upper and lower surfaces 44 and 45 tapered for interengagement with slight clearance with the upper and lower inner surfaces 29 and 30 of the recess 28 in the keeper member 20. To permit disposal of the fingers 38 and 43 in the opening 24 and recess 28, the facing walls 46 and 47 of the projections 22 and 23 are spaced apart a distance slightly greater than the width or diameter of the annular body portion 48 of the shaft extension 37. The upper shaft extension 37' is formed with radial fingers 38' and 43' which are identical in configuration to the aforedescribed fingers 38 and 43 respectively; a plan view of the fingers 38' and 43' would correspond to the plan view of the fingers 38 and 43 in FIGURE 5.

The elements of the door locking and stabilizing mechanism of my present invention are shown in a locked or closed position in FIGURE 1. To open the door locking mechanism, the hand lever 35 may be released from the seal member 36 and swung in a horizontal plane to a forwardly extending position so that the shaft 31 and shaft extensions 37-37' are caused to rotate on their common axes. As the shaft extensions 37-37' are thus rotated, the fingers 43-43' are moved outwardly of the recesses 28 in the keeper members 20 and the fingers 38-38' are withdrawn from the openings 24. Thereafter, the doors 15 and 16 may be swung outwardly of the plane of the door frame 10 to an open position.

In closing the door frame 10, the doors 15 and 16 are swung to a position generally in the plane of the frame 10. Initially, the projections 22 and 23 serve to receive the shaft extensions 37-37' to facilitate operative alignment and engagement of the fingers 38-38' and 43-43' with the openings 24 and recesses 28 in the keeper members 20. The hand lever 35 is then pivoted from a forwardly extending position toward the position shown in FIGURE 1 whereupon the shaft 31 is rotated for causing the fingers 38-38' to enter the lateral openings 24 in the keeper members 20. As the fingers 38-38' begin to engage the inner forward surfaces 25 of the lateral openings 24 in the keeper members 20, the points of contact serve as fulcrum points about which leverage is applied to force the door 16 within the plane of the frame 10. Further rotation of the shaft 31 disposes the fingers 38-38' more fully within the openings 24. When the fingers 38-38' upon additional rotation engage the upper and lower inner surfaces 26 and 27 of the lateral openings 24 and the fingers 43-43' engage the upper and lower inner surfaces 44 and 45 of the recesses 28, the frame 10 and door 16 are forced relatively in a vertical direction and are aligned as the door 16 is swung within the plane of the frame. Still further, when the forward surfaces of the fingers 38-38' are in full engagement with the inner forward surfaces 25 of the lateral openings 24, they serve to restrain the door 16 from swinging outwardly of the plane of the door frame. After the fingers 38-38' and 43-43' have been disposed in full locking engagement with the keeper members 20, the hand lever 35 may be secured within the seal member 36. Upon completion of the afore-described closing operation, the diametrically opposed fingers 38-38' and 43-43' serve to balance bending forces imposed on the shaft 31 or extensions 37-37', and the walls 46 and 47 of the projections 22 and 23 serve to limit lateral bending of the shaft 31 and extensions 37-37'.

As will be readily understood by those skilled in the art, the door 16 is locked within the plane of the door frame 10 by the door locking and stabilizing mechanism of my present invention while the door 15 is retained in the plane of the door frame 10 by virtue of the engagement of the door 16 with the limit strip 19. With the door locking and stabilizing mechanism disposed in the operative position shown in FIGURE 1, the doors 15 and 16 are structurally locked within the door frame 10 so as to reinforce the top and bottom thereof, prevent deformation and structural failure of the door frame, and reduce wear between the free edges of the doors and between the doors and the door frame.

In the modified embodiment of my invention shown in FIGURES 6 and 7, the components of the keeper member 20a correspond to the components of the keeper member 20 with the exception of the projection 50 which has compound tapered inner surfaces. More specifically, the projection 50 has a recess 51 therein with an open forward end with upper and lower inner surfaces 52 and 53 which taper toward each other both in a rearward direction and in a lateral direction away from the center of the keeper member 20a. Operatively associated with the keeper member 20a is a shaft extension 37a that corresponds in all respects to the shaft extension 37 with the exception of the radially extending finger 54 which has upper and lower surfaces 55 and 56 compound-tapered for interengagement with slight clearance with the upper and lower surfaces 52 and 53 of the recess 51. The embodiment of the keeper and finger construction 20a-37a shown in FIGURES 6 and 7, when substituted for the keeper and finger construction 20-37 shown in FIGURES 1 through 5, offers improved resistance to the tendency of the shaft 31 to rotate when axial pressure is exerted on the taper of the keeper.

While I have illustrated a preferred form of my present invention, I do not intend to be limited thereto, except insofar as the claims are so limited, since certain modifications coming within the scope of my invention will be suggested to those skilled in the art, particularly in the light of my disclosure.

I claim:

1. For use with a door frame having upper and lower elements and a door having a vertical edge hinged to the frame, the combination of a vertically extending shaft rotatably mounted on the outer face of the door, keeper means mounted on the upper and lower elements of the frame, each of said keeper means having laterally spaced forwardly extending projections, one of said projections of each of said keeper means having a lateral opening therein with an inner forward surface and with upper and lower inner surfaces one of which is tapered in a lateral direction away from the center of the keeper means, the other of said projections of each of said keeper means having a recess therein with an open forward end and with upper and lower inner surfaces one of which is tapered in a rearward direction, first radially extending fingers one each on the upper and lower ends of said shaft and adapted to be received in said lateral openings in said keeper means on rotation of said shaft, second radially extending fingers one each on the upper and lower ends of said shaft and adapted to be received in said recesses in said keeper means on rotation of said shaft, said first fingers during engagement with said inner forward surfaces of said lateral openings in said keeper means serving to force the door within the plane of the frame, said first fingers upon engagement with said upper and lower inner surfaces of said lateral openings in said keeper means and said second fingers upon engagement with said upper and lower inner surfaces of said recesses serving to force the frame and door relatively in a vertical direction to align the same as the door is swung within the plane of the frame, and said first fingers when in full engagement with said inner forward surfaces of said lateral openings in said keeper means serving to restrain the door from swinging outwardly of the plane of the frame.

2. For use with a door frame having upper and lower elements and a door having a vertical edge hinged to the frame, the combination of a vertically extending shaft rotatably mounted on the outer face of the door, keeper means mounted on the upper and lower elements of the frame, each of said keeper means having laterally spaced forwardly extending projections, one of said projections of each of said keeper means having a lateral opening therein with an inner forward surface and with upper and lower inner surfaces tapering toward each other in a lateral direction away from the center of the keeper means, the other of said projections of each of said keeper means having a recess therein with an open forward end and with upper and lower inner surfaces tapering toward each other in a rearward direction, first radially extending fingers one each on the upper and lower ends of said shaft and adapted to be received in said lateral openings in said keeper means on rotation of said shaft, second radially extending fingers one each on the upper and lower ends of said shaft and adapted to be received in said recesses in said keeper means on rotation of said shaft, said first fingers during engagement with said inner forward surfaces of said lateral openings in said keeper means serving to force the door within the plane of the frame, said first fingers upon engagement with said upper and lower inner surfaces of said lateral openings in said keeper means and said second fingers upon engagement with said upper and lower inner surfaces of said recesses serving to force the frame and door relatively in a vertical direction to align the same as the door is swung within the plane of the frame, and said first fingers when in full engagement with said inner forward surfaces of said lateral openings in said keeper means serving to restrain the door from swinging outwardly of the plane of the frame.

3. For use with a door frame having upper and lower elements and a door having a vertical edge hinged to the frame, the combination of a vertically extending shaft rotatably mounted on the outer face of the door, keeper means mounted on the upper and lower elements of the frame, each of said keeper means having laterally spaced forwardly extending projections, one of said projections of each of said keeper means having a lateral opening therein with an inner forward surface and with upper and lower inner surfaces tapering toward each other in a lateral direction away from the center of the keeper means, the other of said projections of each of said keeper means having a recess therein with an open forward end and with upper and lower inner surfaces tapering toward each other in a rearward direction, first radially extending fingers one each on the upper and lower ends of said shaft and adapted to be received in said lateral openings in said keeper means on rotation of said shaft, said first fingers having upper and lower tapered surfaces arranged for interengagement with said upper and lower inner surfaces of said lateral openings in said keeper means, second radially extending fingers one each on the upper and lower ends of said shaft and adapted to be received in said recesses in said keeper means on rotation of said shaft, said second fingers having upper and lower tapered surfaces arranged for interengagement with said upper and lower inner surfaces of said recesses in said keeper means, said first fingers during engagement with said inner forward surfaces of said lateral openings in said keeper means serving to force the door within the plane of the frame, said first fingers upon engagement with said upper and lower inner surfaces of said lateral openings in said keeper means and said second fingers upon engagement with said upper and lower inner surfaces of said recesses serving to force the frame and door relatively in a vertical direction to align the same as the door is swung within the plane of the frame, and said first fingers when in full engagement with said inner forward surfaces of said lateral openings in said keeper means serving to restrain the door from swinging outwardly of the plane of the frame.

4. For use with a door frame having upper and lower elements and a door having a vertical edge hinged to the frame, the combination of a vertically extending shaft rotatably mounted on the outer face of the door, said shaft having extensions on the ends thereof overlying the upper and lower elements of the frame when the door is swung within the plane of the frame, keeper means mounted on the upper and lower elements of the frame, each of said keeper means having forwardly extending projections, said projections on each of said keeper means being spaced laterally a distance slightly greater than the width of said shaft extensions, one of said projections of each of said keeper means having a lateral opening therein with an inner forward surface and with upper and lower inner surfaces, the other of said projections of each of said keeper means having a recess therein with an open forward end and with upper and lower rearwardly extending inner surfaces, first radially extending fingers one each on said shaft extensions and adapted to be received in said lateral openings in said keeper means on rotation of said shaft, second radially extending fingers one each on said shaft extensions and adapted to be received in said recesses in said keeper means on rotation of said shaft, said projections on said keeper means serving to receive said shaft extensions therebetween on swinging of the door toward the plane of the frame to facilitate operative alignment and engagement of said first and second fingers with the lateral openings and recesses in said keeper means, said first fingers during engagement with said inner forward surfaces of said lateral openings in said keeper means serving to force the door within the plane of the frame, said first fingers upon engagement with said upper and lower inner surfaces of said lateral openings in said keeper means and said second fingers upon engagement with said upper and lower inner surfaces of said recesses serving to force the frame and door relatively in a vertical direction to align the same as the door is swung within the plane of the frame, said first fingers when in full engagement with said inner forward surfaces of said lateral openings in said keeper means serving to restrain the door from swinging outwardly of the plane of the frame, and said projections on said keeper means serving to limit lateral bending of said shaft when the door is in the plane of the frame.

5. For use with a door frame having upper and lower elements in a door having a vertical edge hinged to the frame, the combination of a vertically extending shaft rotatably mounted on the outer face of the door, said shaft having extensions on the ends thereof overlying the upper and lower elements of the frame when the door is swung within the plane of the frame, keeper members mounted on the upper and lower elements of the frame, each of said keeper members having forwardly extending projections, said projections on each of said keeper members being spaced laterally a distance slightly greater than the width of said shaft extension, one of said projections of each of said keeper members having a lateral opening therein with an inner forward surface and with upper and lower inner surfaces tapering toward each other in a lateral direction away from the center of the keeper member, the other or said projections of each of said keeper members having a recess therein with an open forward end and with upper and lower inner surfaces tapering toward each other in a rearward direction, first radially extending fingers one each on said shaft extensions and adapted to be received in said lateral openings in said keeper members on rotation of said shaft, said first fingers having upper and lower tapered surfaces arranged for interengagement with said upper and lower inner surfaces of said lateral openings in said keeper means, second radially extending fingers one each on said shaft extensions and adapted to be received in said recesses in said keeper members on rotation of said shaft, said second fingers having upper and lower tapered surfaces arranged for interengagement with said upper and lower inner surfaces of said recesses in said keeper member, said projections on said keeper member serving to receive said shaft extension therebetween on swinging of the door toward the plane of the frame to facilitate operative alignment and engagement of said first and second fingers with the lateral openings and recesses in said keeper members, said first fingers during engagement with said inner forward surfaces of said lateral openings in said keeper members serving to force the door within the plane of the frame, said first fingers upon engagement with said upper and lower inner surfaces of said lateral openings in said keeper member and said second fingers upon engagement with said upper and lower inner surfaces of said recesses serving to force the frame and door relatively in a vertical direction to align the same as the door is swung within the plane of the frame, said first fingers when in full engagement with said inner forward surfaces of said lateral openings in said keeper members serving to restrain the door from swinging outwardly of the plane of the frame, and said projections on said keeper members serving to limit lateral bending of said shaft when the door is in the plane of the frame.

6. A door lock comprising a keeper member having laterally spaced forwardly extending projections, one of said projections of said keeper member having a lateral opening therein with an inner forward surface and with upper and lower inner surfaces one of which is tapered in a lateral direction away from the center of the keeper member, the other of said projections of said keeper member having a recess therein with an open forward end and with upper and lower inner surfaces one of which is tapered in a rearward direction, a carrier member rotatable relative to said keeper member, a first radially extending finger on said carrier member and adapted to be received in said lateral opening in said keeper member on rotation of said carrier member, a second radially extending finger on said carrier member and adapted to be received in said recess in said keeper member on rotation of said carrier member, said first finger during engagement with said inner forward surface of said lateral opening in said keeper member serving to force said carrier member toward said keeper member, said first finger upon engagement with said upper and lower inner surfaces of said lateral opening in said keeper member and said second finger upon engagement with said upper and lower inner surfaces of said recess serving to align said carrier member and said keeper member and to hold the same against relative vertical movement, and said first finger when in full engagement with said inner forward surface of said lateral opening in said keeper member serving to restrain the carrier member from swinging away from said keeper member.

7. A door lock comprising a keeper member having laterally spaced forwardly extending projections, one of said projections of said keeper member having a lateral opening therein with an inner forward surface and with upper and lower inner surfaces tapering toward each other in a lateral direction away from the center of the keeper member, the other of said projections of said keeper member having a recess therein with an open forward end and with upper and lower inner surfaces tapering toward each other in a rearward direction, a carrier member rotatable relative to said keeper member, a first radially extending finger on said carrier member and adapted to be received in said lateral opening in said keeper member on rotation of said carrier member, a second radially extending finger on said carrier member and adapted to be received in said recess in said keeper member on rotation of said carrier member, said first finger during engagement with said inner forward surface of said lateral opening in said keeper member serving to force said carrier member toward said keeper member, said first finger upon engagement with said upper and lower inner surfaces of said lateral opening in said keeper member and said second finger upon engagement with said upper and lower inner surfaces of said recess serving to align said carrier member and said keeper member and to hold the same against relative vertical movement, and said first finger when in full engagement with said inner forward surface of said lateral opening in said keeper member serving to restrain the carrier member from swinging away from said keeper member.

8. A door lock comprising a keeper member having laterally spaced forwardly extending projections, one of said projections of said keeper member having a lateral opening therein with an inner forward surface and with upper and lower inner surfaces tapering toward each other in a lateral direction away from the center of the keeper member, the other of said projections of said keeper member having a recess therein with an open forward end and with upper and lower inner surfaces tapering toward each other in a rearward direction, a carrier member rotatable relative to said keeper member, a first radially extending finger on said carrier member and adapted to be received in said lateral opening in said keeper member on rotation of said carrier member, said first finger having upper and lower tapered surfaces arranged for interengagement with said upper and lower inner surfaces of said lateral opening in said keeper member, a second radially extending finger on said carrier member and adapted to be received in said recess in said keeper member on rotation of said carrier member, said second finger having upper and lower tapered surfaces arranged for interengagement with said upper and lower inner surfaces of said recess in said keeper member, said first finger during engagement with said inner forward surface of said lateral opening in said keeper member serving to force said carrier member toward said keeper member, said first finger upon engagement with said upper and lower inner surfaces of said lateral opening in said keeper member and said second finger upon engagement with said upper and lower inner surfaces of said recess serving to align said carrier member and said keeper member and to hold the same against relative vertical movement, and said first finger when in full engagement with said inner forward surface of said lateral opening in said keeper member serving to restrain the carrier member from swinging away from said keeper member.

9. A door lock comprising a keeper member having laterally spaced forwardly extending projections, a carrier member rotatable relative to said keeper member, said projections on said keeper member being spaced laterally a distance slightly greater than the width of the intermediate part of said carrier member, one of said projections of said keeper member having a lateral opening therein with an inner forward surface and with upper and lower inner surfaces tapering toward each other in a lateral direction away from the center of the keeper member, the other of said projections of said keeper member having a recess therein with an open forward end and with upper and lower inner surfaces tapering toward each other in a rearward direction, a first radially extending finger on said carrier member and adapted to be received in said lateral opening in said keeper member on rotation of said carrier member, said first finger having upper and lower tapered surfaces arranged for interengagement with said upper and lower inner surfaces of said lateral opening in said keeper member, a second radially extending finger on said carrier member and adapted to be received in said recess in said keeper member on rotation of said carrier member, said second finger having upper and lower tapered surfaces arranged for interengagement with said upper and lower inner surfaces of said recess in said keeper member, said projections on said keeper member serving to receive said carrier member therebetween on movement of the carrier member toward said keeper member to facilitate operative alignment and engagement of said first and second fingers with said lateral opening and recess in said keeper member, said first finger during engagement with said inner forward surface of said lateral opening in said keeper member serving to force said carrier member toward said keeper member, said first finger upon engagement with said upper and lower inner surfaces of said lateral opening in said keeper member and said second finger upon engagement with said upper and lower inner surfaces of said recess serving to align said carrier member and said keeper member and to hold the same against relative vertical movement, said first finger when in full engagement with said inner forward surface of said lateral opening in said keeper member serving to restrain the carrier member from swinging away from said keeper member, and said projections on said keeper member serving to limit lateral bending of said carrier member relative to said keeper member when said first and second fingers are in engagement with said lateral opening and recess in said keeper member.

10. For use with a door frame having upper and lower elements and a door having a vertical edge hinged to the frame, the combination of a vertically extending shaft rotatably mounted on the outer face of the door, keeper means mounted on the upper and lower elements of the frame, each of said keeper means having laterally spaced forwardly extending projections, one of said projections of each of said keeper means having a lateral opening therein with an inner forward surface and with upper and lower inner surfaces, the other of said projections of each of said keeper means having a recess therein with an open forward end and with upper and lower inner surfaces tapering toward each other both in a rearward direction and in a lateral direction away from the center of the keeper means, first radially extending fingers one each on the upper and lower ends of said shaft and adapted to be received in said lateral openings in said keeper means on rotation of said shaft, second radially extending fingers one each on the upper and lower ends of said shaft and adapted to be received in said recesses in said keeper means on rotation of said shaft, said second fingers having upper and lower tapered surfaces arranged for interengagement with said upper and lower inner surfaces of said recesses in said keeper means, said first fingers during engagement with said inner forward surfaces of said lateral openings in said keeper means serving to force the door within the plane of the frame, said first fingers upon engagement with said upper and lower inner surfaces of said lateral openings in said keeper means and said second fingers upon engagement with said upper and lower inner surfaces of said recesses serving to force the frame and door relatively in a vertical direction to align the same as the door is swung within the plane of the frame, and said first fingers when in full engagement with said inner forward surfaces of said lateral openings in said keeper means serving to restrain the door from swinging outwardly of the plane of the frame.

11. For use with a door frame having upper and lower elements and a door having a vertical edge hinged to the frame, the combination of a vertically extending shaft rotatably mounted on the outer face of the door, keeper means mounted on the upper and lower elements of the frame, each of said keeper means having laterally spaced forwardly extending projections, one of said projections of each of said keeper means having a lateral opening therein with an inner forward surface and with upper and lower inner surfaces tapering toward each other in a lateral direction away from the center of the keeper means, the other of said projections of each of said keeper means having a recess therein with an open forward end and with upper and lower inner surfaces tapering toward each other both in a rearward direction and in a lateral direction away from the center of the keeper means, first radially extending fingers one each on the upper and lower ends of said shaft and adapted to be received in said lateral openings in said keeper means on rotation of said shaft, said first fingers having upper and lower tapered surfaces arranged for interengagement with said upper and lower inner surfaces of said lateral openings in said keeper means, second radially extending fingers one each on the upper and lower ends of said shaft and adapted to be received in said recesses in said keeper means on rotation of said shaft, said second fingers having upper and lower tapered surfaces arranged for interengagement with said upper and lower inner surfaces of said recesses in said keeper means, said first fingers during engagement with said inner forward surfaces of said lateral openings in said keeper means serving to force the door within the plane of the frame, said first fingers upon engagement with said upper and lower inner surfaces of said lateral openings in said keeper means and said second fingers upon engagement with said upper and lower inner surfaces of said recesses serving to force the frame and door relatively in a vertical direction to align the same as the door is swung within the plane of the frame, and said first fingers when in full engagement with said inner forward surfaces of said lateral openings in said keeper means serving to restrain the door from swinging outwardly of the plane of the frame.

12. A door lock comprising a keeper member having laterally spaced forwardly extending projections, one of said projections of said keeper member having a lateral opening therein with an inner forward surface and with upper and lower inner surfaces, the other of said projections of said keeper member having a recess therein with an open forward end and with upper and lower inner surfaces tapering toward each other both in a rearward direction and in a lateral direction away from the center of the keeper means, a carrier member rotatable relative to said keeper member, a first radially extending finger on said carrier member and adapted to be received in said lateral opening in said keeper member on rotation of said carrier member, a second radially extending finger on said carrier member and adapted to be received in said recess in said keeper member on rotation of said carrier member, said first finger during engagement with said inner forward surface of said lateral opening in said keeper member serving to force said carrier member toward said keeper member, said first finger upon engagement with said upper and lower inner surfaces of said lateral opening in said keeper member and said second finger upon engagement with said upper and lower inner surfaces of said recess serving to align said carrier member and said keeper member and to hold the same against relative vertical movement, and said first finger when in full engagement with said inner forward surface of said lateral opening in said keeper member serving to restrain the carrier member from swinging away from said keeper member.

References Cited by the Examiner

UNITED STATES PATENTS

| | | | |
|---|---|---|---|
| 2,301,444 | 11/42 | Olander | 292—241 X |
| 2,451,537 | 10/48 | Dath | 292—241 X |
| 2,538,203 | 1/51 | Lehman | 292—218 |
| 2,861,830 | 11/58 | Bennett | 292—240 |
| 3,099,473 | 7/63 | Pastva | 292—240 |

M. HENSON WOOD, JR., *Primary Examiner.*